(12) United States Patent
Craig

(10) Patent No.: US 12,496,808 B2
(45) Date of Patent: Dec. 16, 2025

(54) METAL MATRIX NANO CARBON MATERIAL COMPOSITES PRODUCED WITH LOW TEMPERATURE PROCESSING

(71) Applicant: Hugh Craig, Sedona, AZ (US)

(72) Inventor: Hugh Craig, Sedona, AZ (US)

(*) Notice: Subject to any disclaimer, the term of this patent is extended or adjusted under 35 U.S.C. 154(b) by 120 days.

(21) Appl. No.: 17/810,965

(22) Filed: Jul. 6, 2022

(65) Prior Publication Data
US 2023/0022914 A1   Jan. 26, 2023

Related U.S. Application Data

(60) Provisional application No. 63/218,847, filed on Jul. 6, 2021.

(51) Int. Cl.
| | | |
|---|---|---|
| *B32B 15/20* | (2006.01) | |
| *B32B 15/14* | (2006.01) | |
| *B32B 37/10* | (2006.01) | |
| *B32B 37/14* | (2006.01) | |
| *B32B 37/16* | (2006.01) | |
| *B32B 38/00* | (2006.01) | |

(52) U.S. Cl.
CPC .............. *B32B 15/20* (2013.01); *B32B 15/14* (2013.01); *B32B 37/1045* (2013.01); *B32B 37/144* (2013.01); *B32B 37/16* (2013.01); *B32B 38/0008* (2013.01); *B32B 2250/03* (2013.01); *B32B 2250/40* (2013.01); *B32B 2262/106* (2013.01); *B32B 2305/08* (2013.01); *B32B 2305/20* (2013.01); *B32B 2307/536* (2013.01); *B32B 2310/028* (2013.01); *B32B 2310/14* (2013.01); *B32B 2311/12* (2013.01); *B32B 2311/18* (2013.01); *B32B 2311/24* (2013.01); *B32B 2313/04* (2013.01)

(58) Field of Classification Search
CPC ..... B32B 15/20; B32B 15/14; B32B 37/1045; B32B 37/144; B32B 37/16; B32B 38/0008; B32B 2250/03; B32B 2250/40; B32B 2262/106; B32B 2305/08; B32B 2305/20; B32B 2307/536; B32B 2310/028; B32B 2310/14; B32B 2311/12; B32B 2311/18; B32B 2311/24; B32B 2313/04
See application file for complete search history.

(56) References Cited

FOREIGN PATENT DOCUMENTS

CN   113954461 A   *   1/2022

OTHER PUBLICATIONS

English translation of CN-113954461.*
Walsh et al. "Plasma electrolytic oxidation (PEO) for production of anodised coatings on lightweight metal (Al, Mg, Ti) alloys" Transactions of the IMF 87 (3) 122-135 2009.*
Wu et al. "Preparation and Properties of Carbon Fiber/Titanium Alloy Composite for Automobile" Proceedings of SAE-China Congress 2015.*

(Continued)

*Primary Examiner* — Robert S Walters, Jr.
(74) *Attorney, Agent, or Firm* — AVEK IP, LLC (57) ABSTRACT

High-performance metal matrix composites of copper, aluminum, and/or titanium are produced by embedding nano-carbon reinforcement into metal foil or sheet which is concurrently laminated into a multilayer structure to produce high-performance materials for thermal management, enhanced electrical conductivity, armor products and high-strength composite structures.

14 Claims, 6 Drawing Sheets

(56) References Cited

OTHER PUBLICATIONS

Johnson et al. "Carbon nanotube wools made directly from CO2 by molten electrolysis: Value driven pathways to carbon dioxide greenhouse gas mitigation" Materials Today Energy 5 (2017) 230-236.*

Bournias-Varotsis et al. "The Efect of Ultrasonic Additive Manufacturing on Integrated Printed Electronic Conductors" Electronic Materials Letters (2018) 14:413-425.*

Jiao et al. "Continuous carbon fiber reinforced Ti/Al3Ti metal-intermetallic laminate (MIL) composites fabricated using ultrasonic consolidation assisted hot pressing sintering" Materials Science & Engineering A 765 (2019) 138255. (Year: 2019).*

Gingerich "Joining Carbon Fiber and Aluminum with Ultrasonic Additive Manufacturing" Undergraduate Honors Thesis Ohio State University 2014. (Year: 2014).*

Yu et al. "Bio-inspired design of SiC-reinforced multi-layered Ti-intermetallic composite" Materials & Design vol. 101, Jul. 2016, pp. 102-108. (Year: 2016).*

\* cited by examiner

201 Graphene

202 Graphite

203 Fullerene

204 Nanotube

METAL MATRIX NANO CARBON MATERIAL COMPOSITES PRODUCED WITH LOW TEMPERATURE PROCESSING

CROSS-REFERENCE TO RELATED APPLICATIONS

This application claims the benefit of priority of U.S. Provisional Patent Application No. 63/218,847, which is titled "Metal Matrix Nano Carbon Material Composites Produced with Low Temperature Processing" and was filed on Jul. 6, 2021, the disclosure of which is incorporated by reference herein in its entirety.

FIELD OF THE INVENTION

The present invention relates generally to novel materials and methods for producing high performance composites made from high strength titanium metal and carbon nanostructured materials such as graphene, graphene oxide, reduced graphene oxide, carbon nanotubes and graphene oxide.

SUMMARY

The following presents a simplified summary of the disclosure in order to provide a basic understand of some aspects of the invention. This summary is not an extensive overview. It is not intended to identify critical elements of the invention or to delineate the scope of the invention. Its sole purpose is to present some concepts of the invention in a simplified form as a prelude to the more detailed description that is presented elsewhere herein.

According to one embodiment, a method of making a metal matrix composite includes embedding carbon reinforcement material into metal.

According to another embodiment, a method of making a metal matrix composite comprises providing a first metal foil and a second metal foil; providing a carbon reinforcement material; placing the carbon reinforcement material between the first metal foil and the second metal foil and pressing the respective metal foils together to make a sandwich structure; and passing the sandwich structure through an ultrasonic consolidation process to embed the carbon reinforcement material to the respective metal foils and to join the respective metal foils together.

In still yet another embodiment, a method of making a metal matrix includes providing a first metal sheet and a second metal sheet; providing a carbon reinforcement material; placing the carbon reinforcement material between the first metal sheet and the second metal sheet and pressing the respective metal sheets together to make a sandwich structure; passing the sandwich structure through an ultrasonic consolidation process to embed the carbon reinforcement material to the respective metal sheets and to join the respective metal sheets together; laminating a third metal sheet to the sandwich structure; and treating the laminated sandwich structure with plasma electrolytic oxidation.

WRITTEN DESCRIPTION

The invention is directed to systems and methods for adhering carbon nanostructured materials to metal matrix composites made from high-strength titanium metal fibers by using these materials in combination (e.g., graphene, graphene oxide, graphene nanoribbons, carbon nanotubes, and the like) to provide covalent adhesion. Such combinations synergistically increase the strength and modulus of the composite structure. The invention is further directed to metal matrix nanocarbon material composites. As detailed below, successful development of nanocarbon reinforced titanium matrix composites result in better wear and mechanical behavior and an enhanced ability to withstand high temperature and structural loading environments.

The invention also relates to novel materials and methods for producing high-performance composite materials with exceptional thermal and electrical conductivity and mechanical properties. This technology may provide improved thermal management for electronic circuits and devices; enhanced electrical performance for interconnecting devices; and stronger lightweight materials for aerospace, and aircraft, road vehicles and infrastructure.

More specifically, the invention is directed to integrating the nano carbon material, carbon nanotubes, graphene and other nanocarbon allotropes into thin films of metal to build multilayered structures with the process of ultrasonic consolidation. Further, methods for producing substrates, heat sinks and heat spreaders for electronic and materials processing are disclosed utilizing the high strength carbon nanomaterial-embedded metals. The high strength carbon nanomaterial-embedded metals may be used for high strength, high hardness composite films, and sheet products which may be used, e.g., for building the next generation of air, water, and road vehicles, as well as developing applications in construction and infrastructure utilizing high strength carbon nanomaterials embedded in metals. Additionally, as described in greater detail below, the high strength carbon nanomaterial-embedded metals may be used in armor products.

Conventional processing methods through which similar materials are made today for aluminum materials are complicated and expensive. Processes that are effective for titanium metal matrix composites have not yet been developed. Resolving these issues and making these products with a simple and economic process is one intent of this invention.

Nanocarbon reinforced metal matrix composites (MMCs) have great potential to replace existing traditional materials in aerospace, automotive, and other high temperature engineering applications. Due to these nanocarbons having low density and high Young's modulus, they are considered to be an excellent reinforcement for metal matrix composites. In the last 20 years, extensive research has been carried out to investigate the combination of these materials with aluminum, nickel, copper, magnesium, and other metals. Excellent mechanical, thermal, and physical properties and improved strength to weight ratio have been noted. Weight savings in the aerospace industry results in higher efficiency. Carbon nanotubes (CNTs) and graphene have been used in metal matrix composites with production techniques such as mechanical alloying through powder metallurgy routes. The effects on the mechanical properties of graphene and CNT reinforced TMCs have been successful with the noted exception of titanium.

As discussed later, several processes have been developed for production of metal matrix composites incorporating carbon nanotubes and/or graphene. The currently preferred methods require the metal to be molten for the mixing of the nanocarbon material into the metal. This method is effective for heavy metals, but for manufacturing metal matrix composites with lightweight structural materials, such as aluminum and titanium, difficulties arise. When hot or molten aluminum or titanium is mixed with carbon nanotubes and/or graphene, the carbon reacts with the metal producing aluminum carbide or titanium carbide, as the case may be, which severely weakens the composite to the point that it is unusable. However, aluminum and titanium are the most desirable materials for both electronic and structural applications as weight is a major consideration in these applications. At present, there is no simple cost-effective method to make these lightweight composites.

Chinese Patent CN105112704A discloses the production of Al MMC by ball milling graphene with aluminum particles and using hot isostatic pressing and extrusion. Although this process provides a metal composite, it does not realize the potential for the material due to interfacial reactions of carbon and aluminum. Additionally, because of the higher temperatures involved, this method is not effective for preparing titanium metal composites since carbon and Aluminum will react with these metals.

In 2012, Oak Ridge National Laboratory worked with XG Sciences, Inc. to develop a processing method for producing a composite material incorporating graphene platelets in a titanium matrix with the goal of improving thermal conductivity. Graphene exhibits a broad range of exceptional properties, including high strength, high thermal conductivity, and excellent electrical conductivity. Graphene has been shown to have a significant effect on composite properties when it is incorporated as a second phase in a polymer or liquid matrix, even at levels as low as 0.1 wt. %. XG Sciences was interested in exploring the use of graphene platelets in a titanium matrix with the goal of increasing the thermal conductivity for use in plate-type heat exchangers. However, the company had no prior experience in combining graphene with metals. The partnership was created to take advantage of ORNL's past experience in titanium powder metallurgy processing and to jump-start XG Sciences' entry into metal matrix composites. The goal of the project was to fabricate composite samples and to demonstrate a 50% increase in thermal conductivity. Initially, a series of test specimens was fabricated by hot pressing blends of titanium powder and graphene. Different grades of graphene and different ratios of graphene to titanium were used for these specimens. It was found that when the hot pressing was done at 700° C. or higher the graphene would react with the titanium metal to form Titanium Carbide. At 500° C. there was no reaction, but the composite could not be consolidated to a high density. As a consequence of these two factors, the thermal conductivity was reduced for samples containing graphene. This would disrupt the propagation of phonons in the material and result in lowering the thermal conductivity.

Powder metallurgy processing was used to produce consolidated plates of the composite material. However, the thermal conductivity of the plates in the through-thickness direction was not improved by the addition of the graphene platelets.

Applications for the Inventive Materials Thermal Management

All electronic devices and circuitry generate excess heat and thus require thermal management to improve reliability and prevent premature failure. The amount of heat output is equal to the power input if there are no other energy interactions. There are several techniques for cooling including various styles of heat sinks, thermoelectric coolers, forced air systems and fans, heat pipes, and others. Heat sinks are widely used in electronics and have become essential to modern microelectronics. In common use, it is a metal object brought into contact with an electronic component's hot surface—though in most cases, a thin thermal interface material mediates between the two surfaces.

Microprocessors and power handling semiconductors are examples of electronics that need a heat sink to reduce their temperature through increased thermal mass and heat dissipation (primarily by conduction and convection and to a lesser extent by radiation). Heat sinks have become almost essential to modern integrated circuits like microprocessors, DSPs, GPUs, and more.

A heat sink usually consists of a metal structure with one or more flat surfaces to ensure good thermal contact with the components to be cooled, and an array of comb or fin-like protrusions to increase the surface contact with the air, and thus the rate of heat dissipation. Heat sinks function by efficiently transferring thermal energy ("heat") from an object at a high temperature to a second object at a lower temperature with a much greater heat capacity. This rapid transfer of thermal energy quickly brings the first object into thermal equilibrium with the second, lowering the temperature of the first object, fulfilling the heat sink's role as a cooling device. The efficient function of a heat sink relies on the rapid transfer of thermal energy from the first object to the heat sink, and the heat sink to the second object.

The most common design of a heat sink is a metal device with many fins. The high thermal conductivity of the metal combined with its large surface area results in the rapid transfer of thermal energy to the surrounding, cooler, air. This cools the heat sink and whatever it is in direct thermal contact with. The use of fluids (for example coolants in refrigeration) and thermal interface material (in cooling electronic devices) ensures a good transfer of thermal energy to the heat sink.

Similarly, a fan may improve the transfer of thermal energy from the heat sink to the air.

A heat sink usually consists of a base with one or more flat surfaces and an array of comb or fin-like protrusions to increase the heat sink's surface area contacting the air and thus increasing the heat dissipation rate. While a heat sink is a static object, a fan often aids a heat sink by providing increased airflow over the heat sink—thus maintaining a larger temperature gradient by replacing the warmed air more quickly than passive convection achieves alone—this is known as a forced-air system.

Ideally, heat sinks are made from a good thermal conductor such as silver, gold, copper, or aluminum alloy. The thermal conductivity of a material is measured in Watts per Kelvin per Meter (W/[MK]). Thermal conductivity is energy swapping. Some materials do this more efficiently than others and thermal conductivity is a measure of this effectiveness. Pure copper has a thermal conductivity of about 400 W/MK while air is about 0.025 W/MK. The thermal conductivity of materials commonly used for heat sinks are shown below:

| | |
|---|---|
| Aluminum | 247 |
| Copper | 398 |
| Silver | 428 |
| Alumina | 39 |
| Diamond | 2000 |
| Graphene | 5000 |
| Epoxy | 0.2 |

Copper and aluminum are among the most-frequently-used materials for this purpose within electronic devices. Copper (401 W/(m·K) at 300 K) is significantly more expensive than aluminum (237 W/(m·K) at 300 K) but is also roughly twice as efficient as a thermal conductor. Aluminum has the significant advantage that it can be easily formed by extrusion, thus making complex cross-sections possible. Aluminum is also much lighter than copper, offering less mechanical stress on delicate electronic components, screws, or thermal adhesive holds the heat sink tightly onto the component, but specifically without the pressure that would crush the component.

Semiconductors with the highest thermal conductivity are boron arsenide (1300 W/(m·K))[8] and boron phosphide (500 W/(m·K)). The heat sink's contact surface (the base) must be flat and smooth to ensure the best thermal contact with the object needing cooling. Frequently a thermally conductive grease is used to ensure optimal thermal contact; such compounds often contain colloidal silver. Further, a clamping mechanism, screws, or thermal adhesive holds the heat sink tightly onto the component, but specifically without the pressure that would crush the component.

Light-Emitting Diodes (LEDs)

LEDs historically have been used for indicators and generally produce low amounts of heat. The introduction of high brightness LEDs with white light and monochromatic colors has led to a movement towards general illumination. The increased electrical currents used to drive the LEDs have focused more attention on the thermal paths in the developments of LED power packaging. The luminous efficiency of LEDs is soon expected to reach over 80 lumens/W, which is approximately 6 times the efficiency of a conventional incandescent tungsten bulb. Thermal management for solid-state lighting applications is a key design parameter for both package and system levels.

A light-emitting diode (LED) is a semiconductor light source that emits light when current flows through it. Electrons in the semiconductor recombine with electron holes, releasing energy in the form of photons. The color of the light (corresponding to the energy of the photons) is determined by the energy required for electrons to cross the band gap of the semiconductor. White light is obtained by using multiple semiconductors or a layer of light-emitting phosphor on the semiconductor device. Appearing as practical electronic components in 1962, the earliest LEDs emitted low-intensity infrared (IR) light. Infrared LEDs are used in remote-control circuits, such as those used with a wide variety of consumer electronics. The first visible-light LEDs were of low intensity and limited to red. Modern LEDs are available across the visible, ultraviolet (UV), and infrared wavelengths, with high light output.

Early LEDs were often used as indicator lamps, replacing small incandescent bulbs, and in seven-segment displays. Recent developments have produced high-output white light LEDs suitable for room and outdoor area lighting. LEDs have led to new displays and sensors, while their high switching rates are useful in advanced communications technology.

LEDs have many advantages over incandescent light sources, including lower energy consumption, longer lifetime, improved physical robustness, smaller size, and faster switching. LEDs are used in applications as diverse as aviation lighting, fairy lights, automotive headlamps, advertising, general lighting, traffic signals, camera flashes, lighted wallpaper, horticultural grow lights, and medical devices.

Structural Applications

Much research has been undertaken on utilizing CNTs as reinforcement for composite material. However, CNT-reinforced MMCs have received the least attention. These composites are being projected for use in structural applications for their high specific strength as well as functional materials for their exciting thermal and electrical characteristics. The critical issues of CNT-reinforced MMCs include processing techniques, nanotube dispersion, interface, strengthening mechanisms, and mechanical properties. Processing techniques used for the synthesis of the composites have been critically reviewed with the objective to achieve a homogeneous distribution of carbon nanotubes in the matrix. The mechanical property improvements achieved by the addition of CNTs in various metal matrix systems have been widely reported. The factors determining strengthening achieved by CNT reinforcement are elucidated as are the structural and chemical stability of CNTs in different metal matrixes and the importance of the CNT/metal interface has been reviewed. The importance of CNT dispersion and its quantification is highlighted and will be resolved in the subject invention through partial solvation of the CNT and graphene.

The need for lightweight, high-strength materials has been recognized since the invention of the airplane. As the strength and stiffness of a material increase, the dimensions, and consequently, the mass, of the material required for a certain load-bearing application is reduced. This leads to several advantages in the case of aircraft and automobiles such as the increase in payload and improvement of fuel efficiency. With global oil resources on a decline, an increase in the fuel efficiency of engines is highly desirable. The inadequacy of metals and alloys in providing both strength and stiffness to a structure has led to the development of metal matrix composites (MMCs), whereupon the strength and ductility is provided by the metal matrix and the strength and/or stiffness is provided by the reinforcement that is either a ceramic or high stiffness metal particulate or fiber.

Metal matrix composites can be designed to possess qualities such as low coefficient of thermal expansion and high thermal conductivity which make them suitable for use in electronic packaging applications. Metal matrix composites today are extensively used in automobile and aerospace applications. In 1960, Roger Bacon demonstrated the formation of graphite whiskers (diameter ranging between fractions of a micrometer to a couple of micrometers) that were flexible and had a tensile strength of up to 20 GPa. Subsequent research led to the development of processes for large-scale production of these fibers by carbonization of Rayon, poly-acrylonitrile (PAN), or pitch. Manufacture of carbon fibers of high strength in the 1960s and 1970s made them the first choice for the manufacture of advanced composites for use in rocket nozzle exit cones, missile nose tips, re-entry heat shields, packaging, and thermal management. Since 1970, carbon fiber reinforced composites have been extensively used in a wide array of applications such as aircraft brakes, space structures, military and commercial planes, lithium batteries, sporting goods, and structural reinforcement.

Armor Applications

For both military and first responders, and even armed vehicles, there is a need for more effective lighter weight armor. Titanium is our strongest and most bulletproof lightweight armor metal but is still ineffective against the high velocity hardened projectiles. Multi-layer titanium foil/carbon nanotube metal matrix composites, such as those described herein, will enable highly effective armor due to the impact resistance of the welded carbon nanotubes that are embedded in the multilayered laminated structure.

Additionally, this armor may be effectively improved with an aluminum foil laminated to the impact face of the armor using the processes described herein. The aluminum face may then be hardened with a plasma electrolytic oxidation (PEO) process that converts the aluminum face to super hard corundum which is configured to absorb high levels of energy while flattening the projectile thereby improving the effectiveness of the armor by increasing the impact area.

Plasma electrolytic oxidation (PEO), also known as electrolytic plasma oxidation (EPO) or micro-arc oxidation (MAO), is an electrochemical surface treatment process for generating oxide coatings on metals. It is similar to anodizing, but it employs higher potentials so that discharges occur and the resulting plasma modifies the structure of the oxide layer. This process can be used to grow thick (tens or hundreds of micrometers), largely crystalline, oxide coatings on metals such as aluminum, magnesium, and titanium. Because they can present high hardness and a continuous barrier, these coatings can offer protection against wear, corrosion, or heat as well as electrical insulation.

The coating is a chemical conversion of the substrate metal into its oxide and grows both inwards and outwards from the original metal surface. Because it grows inward into the substrate, it has excellent adhesion to the substrate metal. A wide range of substrate alloys can be coated, including all wrought aluminum alloys and most cast alloys, although high levels of silicon can reduce coating quality.

Carbon Nanotubes

Research in the field of carbon was revolutionized by the discovery of carbon nanotubes (CNTs) by Iijima in 1991. Although CNTs might have been synthesized in 1960 by Bacon, it took the genius of Iijima to realize that they are tubes made by rolling a graphene sheet onto itself. A multi-walled carbon nanotube (MWCNT) is made up of many single-wall carbon nanotubes (SWCNT) arranged in a concentric manner. Experiments and simulations showed that CNTs have extraordinary mechanical properties over carbon fibers, e.g., stiffness up to 1000 GPa, strength on the order of 100 GPa, and thermal conductivity of up to 6000 W/IV1K. These investigations showed that CNTs were the strongest fibers known to mankind and possess exceptional properties.

Over the last decade, several investigations have been carried out using CNT as reinforcement in different materials, namely polymer, ceramic, and metals.

An exceptionally large number of journal articles have been published on CNT-reinforced composites in the last decade. The major portion of this research has been carried out on the reinforcement of polymers by graphene and carbon nanotubes. This can be attributed primarily to the relative ease of polymer processing, which often does not require high temperatures for consolidation as is needed for metals and ceramic matrixes. Studies on graphene and carbon nanotube reinforcement of ceramic matrix are few as compared to those on polymer matrix, and those on graphene and carbon nanotube reinforced MMCs are even fewer. This is quite surprising because most of the structural materials used in today's world are metals. These articles address various aspects, such as processing, microstructure, modeling of mechanical properties, and the chemical interaction of carbon nanomaterials with metals. The difficulty with dispersion and the incidence of carbide formation in the most desirable lightweight metals needs to be resolved for metal matrix composites to find broad industrial applications.

Figure 2:
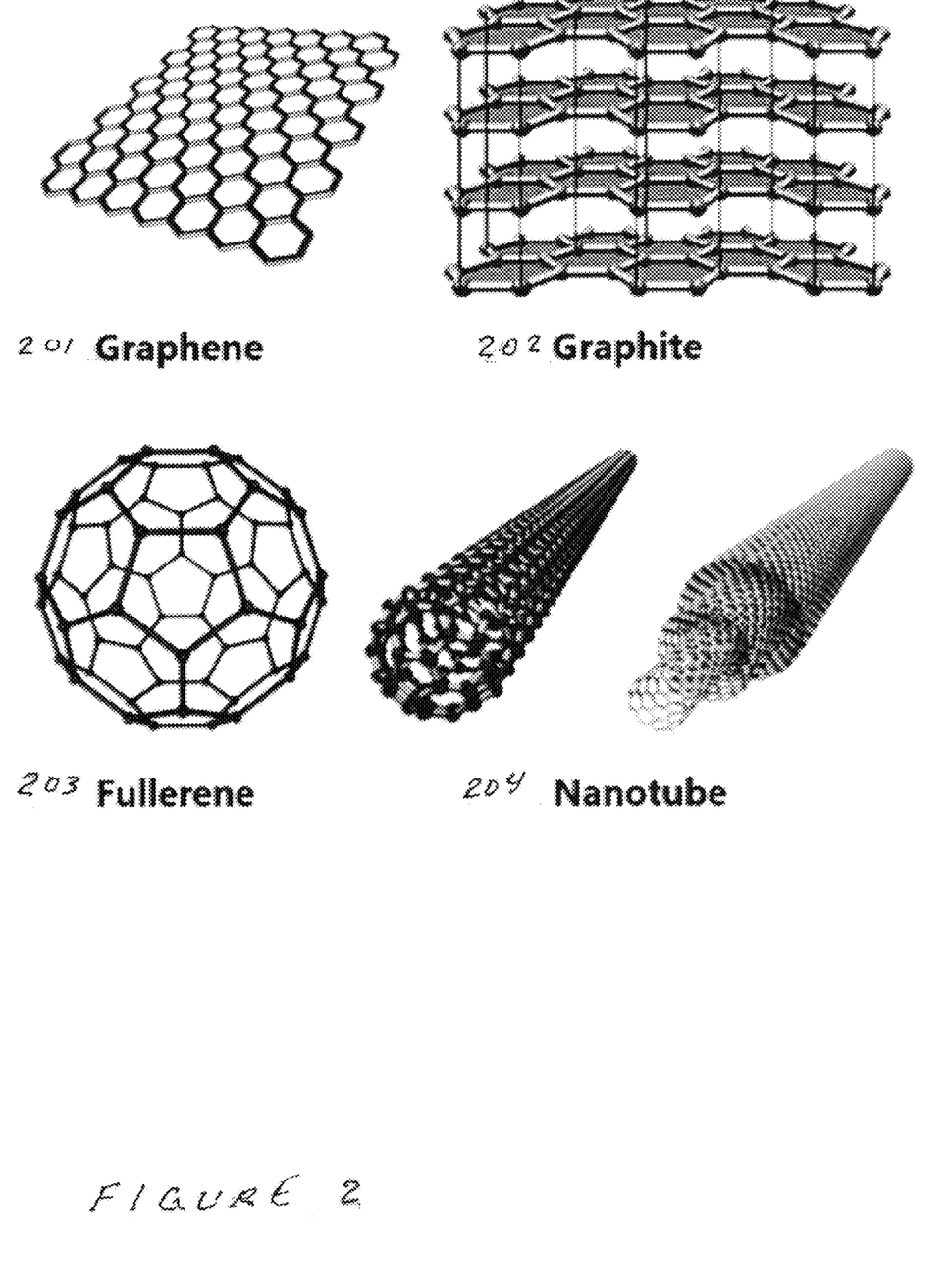
FIG. 2 is an illustration of graphene (201); graphite (202); fullerene (203) and carbon nanotubes (CNT) (204) in both single-wall and multi-wall configurations.

FIG. 2 is an illustration of graphene (201); graphite (202); fullerene (203) and carbon nanotubes (204) in both single-wall and multi-wall configurations.

Processing

Carbon nanotube reinforced metal matrix (MM-CNT) composites are prepared through a variety of processing techniques. Several processes have been adopted for the synthesis of CNT-reinforced MMICs. Powder metallurgy is the most popular and widely applied technique for preparing MM-CNT composites.

Electrodeposition and electroless deposition are the second most important techniques for deposition of thin coatings of MM-CNT composites, as well as for deposition of metals onto CNTs. For low-melting-point metals such as Mg and bulk metallic glasses, melting and solidification are viable routes. Apart from these techniques, scattered efforts have been made on indigenous methods for preparing MM-CNT composites.

Ultrasonic Consolidation

Ultrasonic Consolidation (UC) is a rapid and low-temperature method of joining metal foils to produce fully dense compositions of a single metal, or for consolidating two or more dissimilar metals; and embedding reinforcing fibers into the metal matrix. UC is a manufacturing technique based on ultrasonic metal welding of a sequence of which are bonded to one another in a layer-by-layer manner. It combines the ability of additive and subtractive manufacturing techniques to create complex three-dimensional shapes. Due to moderately applied pressure and the relatively low temperature experienced by a material during manufacture, UC operates as a solid-state process with the adherence between layers developed by cold welding of the metal foils following the removal of the surface oxide by the ultrasonic energy.

High-frequency (typically 20,000 Hertz) ultrasonic vibrations are locally applied to metal foil or sheets held together under pressure to create a solid-state weld.

Dissimilar metals of different thicknesses can be joined, as well as embedding fiber materials at relatively low temperatures, typically less than 50% of the melt temperature. The process also allows sufficient metal flow for encapsulation of fibers and textiles This temperature control is the principal advantage of the process as it will allow the incorporation of carbon materials into Aluminum or Titanium matrixes without initiating the Carbide reaction which will develop much stronger and conductive composite structures.

Figure 5:
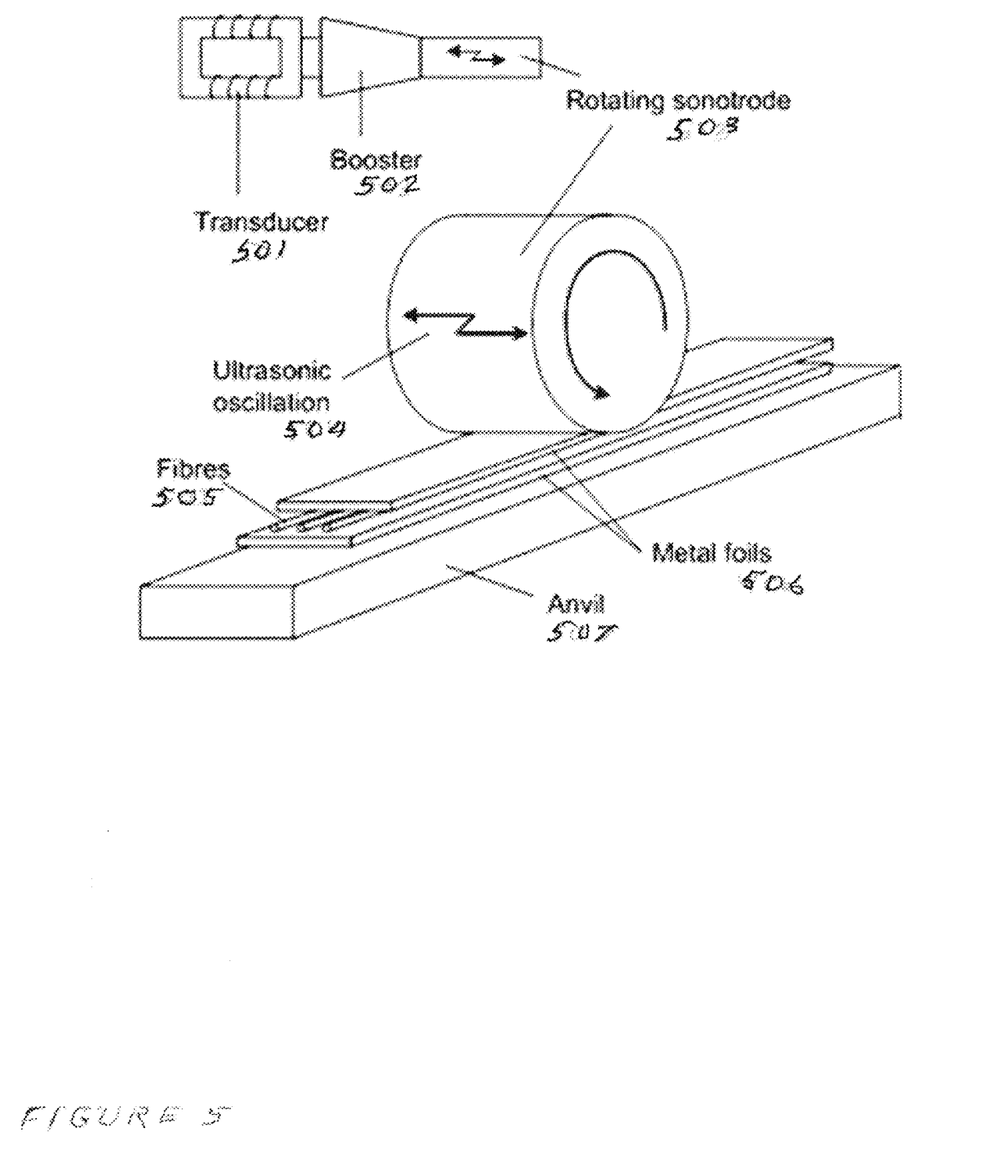
FIG. 5 is an illustration of the ultrasonic consolidation process for embedding fibers and reinforcement between metal sheets and foils.

FIG. 5 is an illustration of the ultrasonic consolidation process for embedding fibers and reinforcement between metal sheets and foils. The process utilizes a transducer (501); booster (502); and a rotating sonotrode (503) which experiences vertical motion (504). The embedded reinforcement (505) and metal foils (506) are illustrated between the sonotrode (503) and the anvil (507).

Nanocarbon Reinforcement

There are several allotropes of graphene that provide excellent reinforcement to polymer and ceramic composite materials. These each provide similar improvements in the mechanical, electrical, and structural properties of metals. Principal among these is graphene, carbon nanotubes, and graphene nanoribbons. These materials are commercially available as powders and in solution, which are not applicable to the ultrasonic consolidation process. For ultrasonic consolation to effectively work with these materials, the graphene materials need to be converted to open foil or fabric configuration. There are several methods available to do this, such as entangled and flattened carbon nanotubes; graphene/CNT aerogels; and graphene, CNT or graphene paper that has been uniformly punched to create holes. Additional methods that will make these materials compatible for this processing are known to those skilled in the technology and are included in this application. The preferred method is to make the nonwoven reinforcement with carbon nanotube wool produced with the C2CNT (Carbon dioxide to carbon nanotubes) process developed at George Washington University. This material is made from carbon dioxide emissions from fossil fuel power plants and is an order of magnitude less expensive than commercially produced carbon nanotubes.

Other methods to make this nonwoven reinforcement are microwave welding of layered carbon nanotubes; flattened aerogels of nano carbons; perforated nanocarbon paper; and woven CNT fabric. A stronger reinforcement may be made with a combination of graphene and carbon nanotubes, and graphene nanoribbons that have been joined by Pi-Pi bonding. For structural applications, carbon nanotubes and potentially graphene nanoribbons, may be welded together at their crossover point with microwave processing which is more intensive at these locations. The nanomaterials must be trimmed to the dimensions of the metal covering sheet for ultrasonic processing.

Using carbon nanotube wool as the reinforcing material may require deagglomeration of the nanotubes making up the wool. To accomplish the deagglomeration, the first step includes partially solubilizing the carbon nanotubes. This may be accomplished by mixing the CNT wool with m-cresol solvent and drying while on metal foil. This separates the agglomerated material while maintaining entanglement. When dry, a second metal foil is placed on top of the flattened wool structure. The sandwich construction is then passed through an ultrasonic consolidation process, which embeds the nanotubes into the metal and welds the metal foils together. This process is repeated until the desired layers of materials and required thicknesses are achieved. With other nanocarbon structures, e.g., aerogels or paper, the process may include first making the reinforcement a think compressed perforated structure that can be placed into an ultrasonic consolidation machine.

Embedding Nanocarbon Reinforcement in Metal with Ultrasonic Consolidation

As discussed above, ultrasonic consolidation (UC) is an additive manufacturing method based on the welding of a sequence of metal foils. The process is suited to producing complex 3D metal parts by combining ultrasonic metal welding and computer numerical control (CNC) milling techniques.

The theory for bond formation that has the most consensus is currently atomic bonding. The foil surfaces, comprising oxide layers and asperities, are brought into contact by the contact pressure of the sonotrode and anvil. The oscillating shear forces generate friction at the interface which causes the impure surface structures to be broken up and dispersed along the weld line. Plastic deformation causes new material to be extruded from underneath which forms the metallurgical bond. By welding one on top of the initial foil and schematic representation of the bond development at the interface.

Previous research has demonstrated the possibility to embed different fiber types within UC metal matrix to create smart material structures. Ultrasonic consolidation has two key advantages which help to overcome limitations such as high pressures, high temperatures, and interfacial reactions which have been observed in well-established metal matrix composites (MMC) manufacturing techniques such as hot isostatic pressing, diffusion bonding, or thermal spraying. The first advantage is that bonding between adjacent metal foils is accomplished at temperatures much lower than the melting temperature of the foil material. Secondly, the ultrasonic excitation of the metal foil reduces the static yield stress within the material and induces highly localized plastic flow.

Successful fiber integration has been demonstrated for silicon carbide, SMA, and optical fibers. The bond formation process was demonstrated to be stronger for higher amplitudes and contact pressures. Consequently, low pressures and amplitudes entailed unbonded surfaces without encapsulation of the fibers or even separation of the foils. For efficient smart material fabrication, higher volume fractions of fibers would be needed for efficient controlling, sensing, and actuating.

Figure 3:
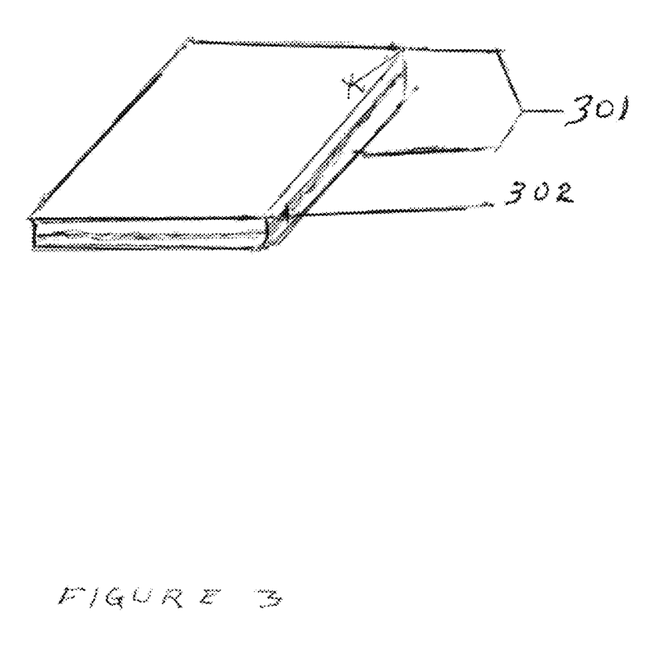
FIG. 3 illustrates a laminate of the metal matrix composite after lamination and consolidation with the metal foil (301) and the embedded CNT reinforcement (302).
Figure 4:
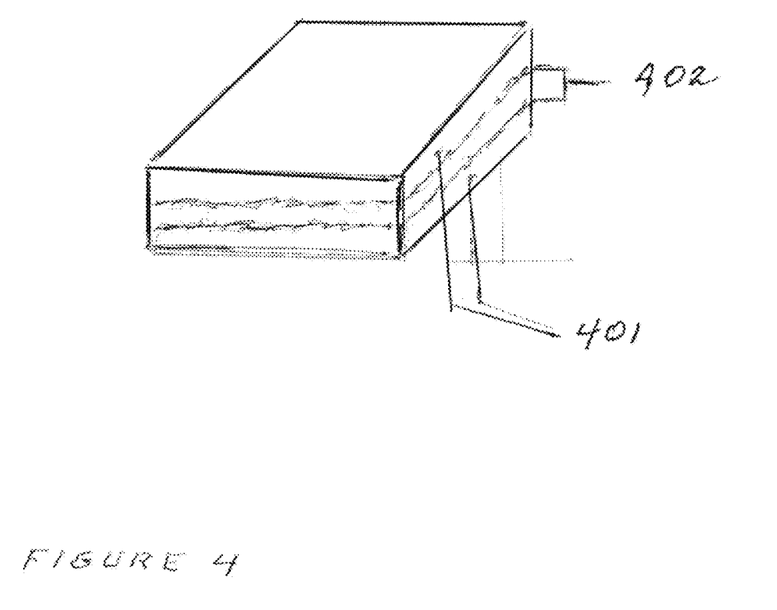
FIG. 4 illustrates the construction of FIG. 3 in a multi-layered structure with the metal foil (401) and the CNT reinforcement (402).
Figure 6:
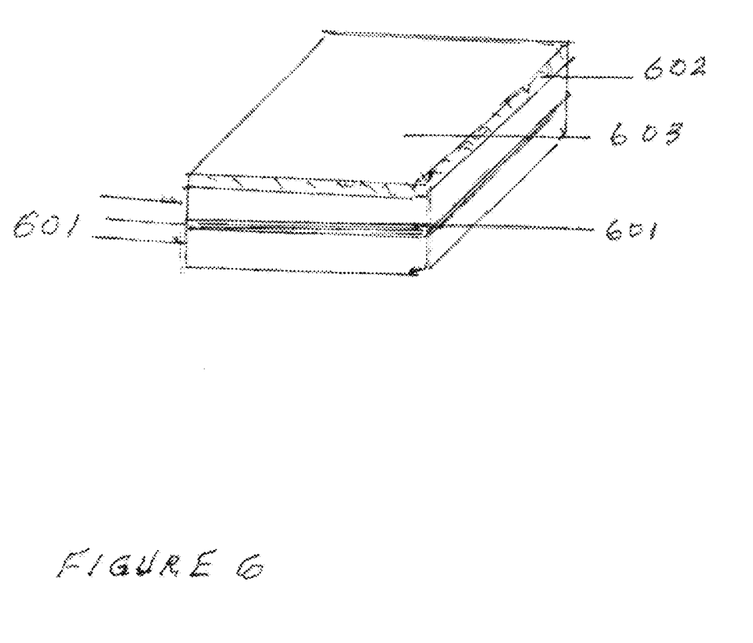
FIG. 6 shows an application of the inventive technology of multilayer laminate of titanium metal reinforced with carbon nanotubes as illustrated in FIG. 5 but modified to make armor products.

Embodiments of the invention is illustrated in FIGS. 3, 4, and 6. More specifically, FIG. 3 illustrates a laminate of the metal matrix composite after lamination and consolidation with the metal foil (301) and the embedded CNT reinforcement (302). FIG. 4 illustrates the construction of FIG. 3 in a multilayered structure with the metal foil (401) and the CNT reinforcement (402). FIG. 6 shows an application of the inventive technology of multilayer laminate of titanium metal (601) reinforced with carbon nanotubes modified to make armor products. Aluminum foil that has been modified by plasma electrolytic oxidation into super hard corundum (602) is laminated to the strike surface (603) to blunt fired projectiles while adsorbing much of the ballistic energy thereby slowing and blunting the projectile.

The preferred embodiment may vary by application, wherein the thermal and electrical applications may preferably be constructed with aluminum, while higher strength and noncorrosive titanium may be preferred for structural materials and armor. For economic and ecological reasons, the product may be produced with carbon nanotube wool, which is derived from carbon dioxide, a greenhouse gas that is affecting the climate of our planet and is potentially less expensive than the alternative materials.

Figure 1:
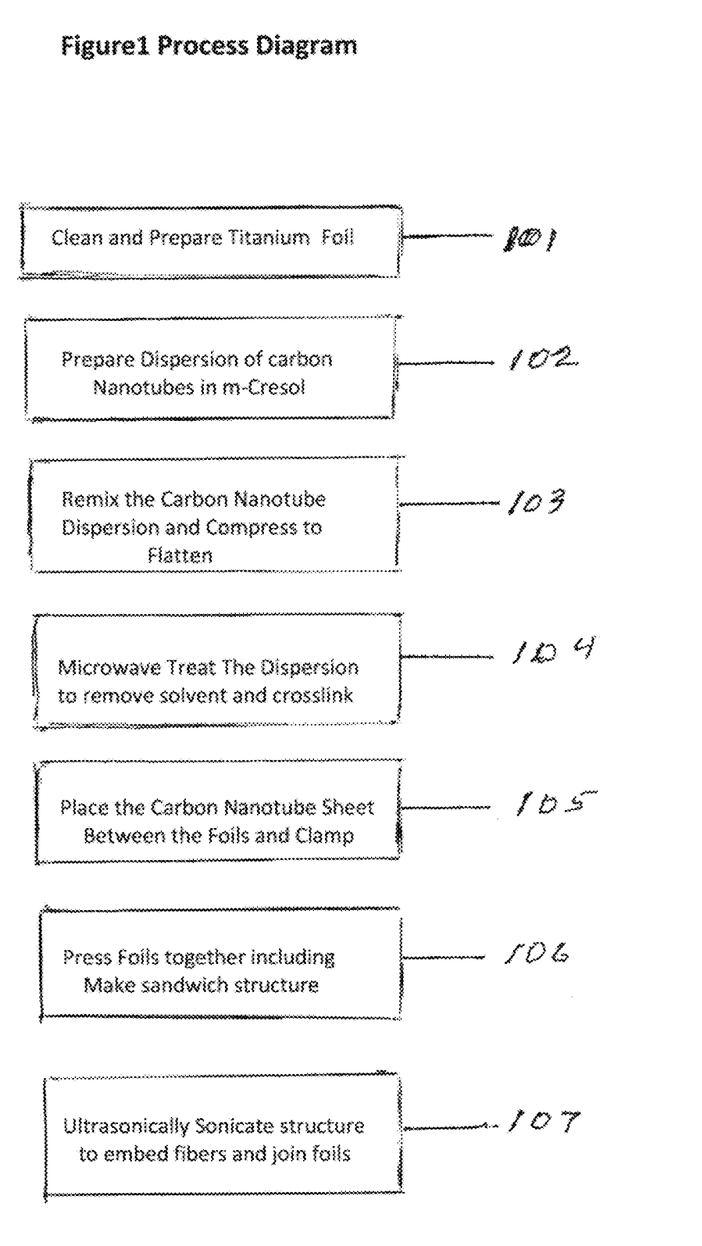
FIG. 1 is an illustration of the process of reinforcing material and metal for the process to convert it into the metal matrix composite.

The processing steps for forming metal matrix composites of titanium are illustrated in FIG. 1. The first manufacturing step (101) is to prepare the material that will be embedded into the metal by cleaning thoroughly. If using the carbon nanotube wool, the wool may require a deagglomeration process as discussed above, which may include trimming and pressing onto the bottom metal foil. The deagglomeration process may include preparing a dispersion (e.g., paste) of carbon nanotubes in m-Cresol and acetone in a second manufacturing step (102). Step (103) includes remixing the carbon nanotube dispersion and compressing to flatten into a thin film.

At step (104), the CNT film is placed into a microwave oven and heated to crosslink the carbon nanotubes to form a matt, which is then heated to remove solvents. The second foil or plate is clamped over the first plate with the CNT matt between to make a sandwich structure at step (105). This sandwich construction is then passed through the ultrasonic consolidation process which embeds the nanotubes into the metal and welds the metal foils together at step (106). The material is now ready to laminate. The materials are aligned pressed together and sonicated to embed the matt and weld together the metal foils. This process may be repeated until the desired layers of materials and required thickness are achieved.

The methods as described herein may produce metal matrix composites of titanium that have not yet been achieved and provide a better, lower-cost method to make a composite of other metallic materials such as aluminum. It is straightforward and simple. The nanocarbon reinforcement is placed between metal foils or sheets and processed through the ultrasonic consolidator. This process can be repeated multiple times to make multilayered structures to achieve design requirements. Armor products may also be produced as an application of the invention by producing a hardened armor capable of withstanding and repelling high-speed hardened ammunition.

This invention provides vastly superior materials for lightweight structural applications that are required to decrease our energy demands for aerospace, aircraft, ships, and all road and rail vehicles. It will provide greatly improved heat exchangers for high-temperature and corrosive environments. Titanium metal matrix composites are ideally suited for armor applications for both personal and military equipment. It is simple to manufacture and can be produced at a relatively low cost. This process takes advantage of the ultrasonic welding process to weld metals without melting the metal. The process causes vertical movement of the top material over the base material that scrubs the metals removing surface oxidation and enabling the metals to "cold" weld together joining the plates and embedding materials that have been placed between them. The frictional heat generated by the process is much less than the metal's melting point allowing the fusion to occur at one-third to one-half of the melting temperature of the metal.

Many different arrangements of the various components depicted, as well as components not shown, are possible without departing from the spirit and scope of the invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the invention. It will be understood that certain features and subcombinations are of utility and may be employed without reference to other features and subcombinations and are contemplated within the scope of the disclosure.

What is claimed is:

1. A method of making a metal matrix composite comprising embedding carbon reinforcement material directly between two metal layers, the two metal layers consisting of a first metal layer and a second metal layer; laminating a foil or sheet consisting of aluminum directly to the first metal layer of the metal matrix composite; and treating the laminated aluminum foil or sheet with plasma electrolytic oxidation to produce a hard corundum surface.

2. The method according to claim 1, wherein the metal layers are aluminum or titanium.

3. The method according to claim 2, wherein the carbon reinforcement material is carbon fiber, carbon nanofiber, carbon nanotubes, graphene, graphene oxide, graphene nanoribbons, or other allotropes of graphene.

4. The method according to claim 3, wherein the carbon reinforcement material is in the shape of a thin film that can be produced by entangled carbon nanotubes, graphene or graphene allotrope aerogel, graphene or graphene allotrope paper, or woven or unwoven fabrics of graphene or graphene allotropes.

5. The method according to claim 2, wherein each metal layer is in the form of a metal foil or a metal sheet.

6. The method according to claim 1, wherein the carbon reinforcement material comprises compressed carbon nanotube wool that has been produced from carbon nanotube wool derived from the conversion of carbon dioxide gas to carbon nanotubes.

7. The method according to claim 1, wherein the metal matrix composite is produced by an ultrasonic consolidation process.

8. The method according to claim 7, wherein the metal layers consist of aluminum.

9. The method according to claim 7, wherein the metal layers consist of titanium.

10. The method according to claim 7, wherein the metal layers comprise a combination of aluminum and titanium.

11. A method of making a metal matrix composite, comprising:
    providing a first metal sheet and a second metal sheet;
    providing a carbon reinforcement material;
    placing the carbon reinforcement material directly between the first metal sheet and the second metal sheet and pressing the respective metal sheets together to make a sandwich structure;
    passing the sandwich structure through an ultrasonic consolidation process to embed the carbon reinforcement material to the respective metal sheets and to join the respective metal sheets together;
    laminating a third metal sheet directly to the first metal sheet of the sandwich structure; and
    treating the third metal sheet with plasma electrolytic oxidation.

12. The method according to claim 11, wherein the first and second metal sheets are aluminum, titanium, or a combination thereof.

13. The method according to claim 12, wherein the third metal sheet comprises aluminum.

14. The method according to claim 13, wherein the carbon reinforcement material comprises carbon fiber, carbon nanofiber, carbon nanotubes, graphene, graphene oxide, graphene nanoribbons, or other allotropes of graphene.

* * * * *